(12) United States Patent
Takeuchi

(10) Patent No.: US 9,618,141 B2
(45) Date of Patent: Apr. 11, 2017

(54) ASSEMBLY OF CABLE AND CABLE SUPPORT DEVICE

(71) Applicant: Junkosha, Inc., Ibaraki (JP)

(72) Inventor: Hiroshi Takeuchi, Ibaraki (JP)

(73) Assignee: Junkosha, Inc., Ibaraki (JP)

( * ) Notice: Subject to any disclaimer, the term of this patent is extended or adjusted under 35 U.S.C. 154(b) by 0 days.

(21) Appl. No.: 14/783,694

(22) PCT Filed: Apr. 1, 2014

(86) PCT No.: PCT/JP2014/059667
§ 371 (c)(1),
(2) Date: Nov. 30, 2015

(87) PCT Pub. No.: WO2014/168050
PCT Pub. Date: Oct. 16, 2014

(65) Prior Publication Data
US 2016/0076670 A1    Mar. 17, 2016

(30) Foreign Application Priority Data

Apr. 10, 2013 (JP) .................................. 2013-082387

(51) Int. Cl.
*F16L 3/08* (2006.01)
*F16L 3/015* (2006.01)
(Continued)

(52) U.S. Cl.
CPC .............. *F16L 3/015* (2013.01); *F16G 13/16* (2013.01); *G02B 6/4439* (2013.01); *H02G 3/04* (2013.01); *H02G 11/00* (2013.01)

(58) Field of Classification Search
CPC ..... F16L 3/015; F16L 3/00; F16L 3/24; F16G 13/16; G02B 6/4439; H02G 3/04; H02G 11/00
(Continued)

(56) References Cited

U.S. PATENT DOCUMENTS 5,322,480 A * 6/1994 Meier ..................... F16G 13/16
174/97
9,163,698 B2 * 10/2015 Kaihotsu ................ F16G 13/16
(Continued)

FOREIGN PATENT DOCUMENTS

| EP | 0911538 | 4/1999 |
| JP | 2008-275058 | 11/2008 |
| JP | 2012-217328 | 11/2012 |

OTHER PUBLICATIONS

PCT International Search Report issued for PCT/JP2014/059667, mailed Jul. 8, 2014, 2 pgs.

*Primary Examiner* — Todd M Epps
(74) *Attorney, Agent, or Firm* — Servilla Whitney LLC

(57) ABSTRACT

Provided is an assembly of a cable and a cable support apparatus capable of suppressing vibrations and noise while saving a cable wiring space. The assembly of a cable and a cable support apparatus includes: at least one cable wired in an approximately U-shape and having one end repeatedly move with respect to the other end; and a cable support apparatus extending along the cable and curved in the approximately U-shape to support the cable, in which the cable support apparatus includes a cable support member including a plurality of piece members articulated along a length direction of the cable and a plurality of bar-shaped cable holding member mounted on at least some of the plurality of piece members to regulate the cable and the cable is disposed on an outer circumferential side at a curved portion having the approximately U-shape with respect to the cable holding member to protrude more outwardly than the cable support apparatus.

8 Claims, 7 Drawing Sheets

(51) Int. Cl.
*F16G 13/16* (2006.01)
*G02B 6/44* (2006.01)
*H02G 3/04* (2006.01)
*H02G 11/00* (2006.01)

(58) Field of Classification Search
USPC .......................................................... 248/70
See application file for complete search history.

(56) References Cited

U.S. PATENT DOCUMENTS 9,404,557 B2 * 8/2016 Kaihotsu ................. F16G 13/16
2007/0163795 A1 * 7/2007 Utaki ................... H02G 11/006
174/19

* cited by examiner

ASSEMBLY OF CABLE AND CABLE SUPPORT DEVICE

CROSS-REFERENCE TO RELATED APPLICATIONS

This application is the national stage entry of PCT/JP2014/059667, filed on Apr. 1, 2014, which claims priority to Japanese Patent Application Number JP2013-082387, filed on Apr. 10, 2013, which are incorporated herein by reference in their entireties.

FIELD

The present disclosure relates to an assembly of curved and movable cable and a cable support apparatus.

BACKGROUND

For example, a machining line, a semiconductor manufacturing apparatus, and an electronic component mounting apparatus have a robot traveling apparatus embedded therein for holding and carrying works, such as a worked material, a wafer, and a substrate. In the robot traveling apparatus, a traveling carriage, which is a moving body reciprocating on a track, is equipped with a robot for handling, for example, a work.

The traveling carriage of the robot traveling apparatus is connected to an electric cable, an optical cable, a hydraulic or pneumatic power supply tube, etc., (hereinafter, referred to as 'cable'). The traveling carriage reciprocates continuously and thus the position of the traveling carriage is changed. Therefore, there is a need to move the cable along with the traveling carriage without causing any problem while the cable follows the change of position. Therefore, by curving and supporting the cable having a predetermined length into a U-shape and by changing the length of the side portions of U letter which face each other, a cable support member is used to allow the cable to follow the change of position of the traveling carriage. As the cable support member, a multi-articulated cable support member disclosed in Patent Document 1 has been known.

The cable support member disclosed in Patent Document 1 includes a plurality of piece members articulated with each other and one coil spring inserted into the piece members to apply a compressive force to the piece members to maintain the articulation. Typically, two cable support members are used as a set. As illustrated in a transverse cross-sectional view of FIG. 4 disclosed in Patent Document 1, a plurality of cables are disposed between the two cable support members and the two cable support members are accommodated in one cable insertion pouch along with the cables to increase integration or suppress dust from occurring.

RELATED ART DOCUMENT

Patent Document

Patent Document 1:Japanese Patent Laid-Open Publication No. 2012-217328

SUMMARY

FIG. 10 is a diagram schematically illustrating a state in which an assembly 101 of a cable and a cable support member according to the related art disposed as illustrated in FIG. 4 of Patent Document 1 is horizontally wired in an appropriately U-shape. In FIG. 10, one end of an upper portion of the cable is coupled with a traveling carriage 102 and the other end of a lower portion thereof is fixed without moving. Further, a lower portion of the assembly 101 is in contact with a basal surface 103.

It is preferable to make a height D of a curved portion of the assembly 101 of the cable and the cable support member illustrated in FIG. 10 substantially equal to a vertical interval S of both ends of the cable in terms of space saving. However, actually, as illustrated in FIG. 10, the height D of the curved portion is larger than the vertical interval S of an end portion. In particular, if the cable support member is accommodated in the cable insertion pouch along with the cable, the phenomenon is remarkable due to a difference between an inside diameter and an outside diameter at the curved portion of the cable insertion pouch. Further, the height D tends to be increased to be appropriate for a long movement stroke of a mobile carriage 102.

Meanwhile, if the cable insertion pouch into which the cable support member is inserted is not used, the cable may cause a rattling or floating phenomenon at the curved portion and even when the cable support member is fixed by a clamp fitting, the phenomenon that a middle portion in a length direction which is to be in a straight state is curved occurs, such that vibrations and noise may be increased. Therefore, in order to prevent the phenomenon, there is a need to use the cable insertion pouch into which the cable support member is inserted.

An object of the present disclosure provides an assembly of a cable and a cable support apparatus capable of suppressing vibrations and noise while saving a cable wiring space.

To solve the problems as described above, according to an embodiment of the present disclosure, an assembly of a cable and a cable support apparatus includes: at least one cable wired in an approximately U-shape and having one end repeatedly move with respect to the other end; and a cable support apparatus extending along the cable and curved in the approximately U-shape to support the cable, in which the cable support apparatus includes a cable support member including a plurality of piece members articulated along a length direction of the cable and a plurality of bar-shaped cable holding member mounted at least some of the plurality of piece members to regulate the cable and the cable is disposed on an outer circumferential side at a curved portion having the approximately U-shape with respect to the cable holding member to protrude more outwardly than the cable support apparatus.

By this configuration, the cable may be disposed on the outer circumferential side at the curved portion with respect to the cable holding member and protrudes more outwardly than the cable support apparatus and therefore the cable holding member may press the cable to a basic surface generally installed at one side having the U-shape and the cable support apparatus may press the cable without interfering with the cable insertion pouch as compared to the form of FIG. 4 as disclosed in Patent Document 1, thereby suppressing the height of the cable at the curved portion from increasing and preventing the cable from rattling even when the cable and the cable support apparatus are not accommodated in one cable insertion pouch.

The cable support apparatus may include the plurality of cable support members disposed in parallel and the plurality of cable support members may also be connected to each other through the plurality of cable holding members. By this configuration, the plurality of cable support members disposed in parallel may be connected to each other, such that the cable support member may maintain integration even when it is not accommodated in the cable insertion pouch and the cable support apparatus which is not easily twisted may be obtained.

In the present disclosure, the cable holding member may be rotatably connected to the piece members. By this configuration, the cable holding portion may function as a roller, thereby suppressing the cable from being damaged and consumed.

In the present disclosure, the two adjacent cable support members of the plurality of cable support members may be disposed so that positions in the length direction of the piece members may mismatch each other between the two adjacent cable support members. As such, the pitch may be shifted, and therefore timings when the curved portion of the cable support member is changed to a straight portion or is changed in the opposite thereto mismatch each other between the plurality of support members, thereby reducing the vibrations and the noise occurring from the support member.

In the present disclosure, the cable support member may include an elastic member inserted into the plurality of piece members to apply a compressive force to the plurality of piece member in the length direction.

DETAILED DESCRIPTION

Hereinafter, an assembly 1 of a cable 2 and a cable support apparatus 3 according to a first embodiment of the present disclosure will be described. Further, the term 'cable' in the present specification is used as a term meaning 'cables' including a flexible fluid tube for supplying hydraulic or pneumatic power, etc., as well as an electrical cable or an optical cable.

Figure 1:
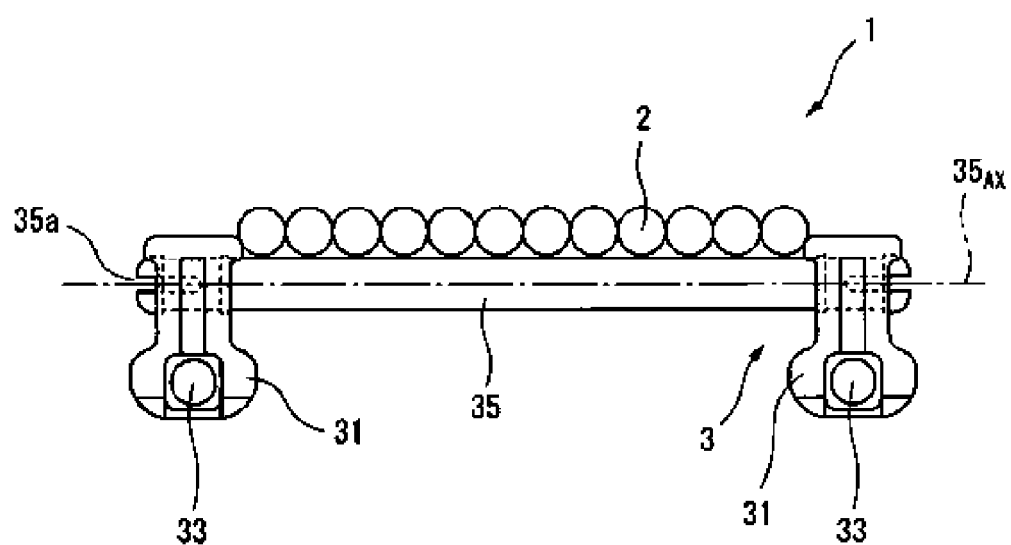
FIG. 1 is a transverse cross-sectional view of an assembly of a cable and a cable support apparatus according to a first embodiment of the present disclosure.

FIG. 1 is a transverse cross-sectional view of a portion where the assembly 1 of the cable 2 and the cable support apparatus 3 (hereinafter, simply short for 'assembly') according to a first embodiment of the present disclosure extends in a straight shape. The assembly 1 of FIG. 1 includes a cable support apparatus 3 and a plurality of cables 2, in this example, 12 cables. According to this embodiment, the cable 2 is connected to a moving body (not illustrated) which reciprocately linearly moves in a horizontal direction (vertical with respect to a paper surface of FIG. 1) and is wired in an approximately a horizontal U-shape or approximately a horizontal J shape to follow a change in position of the moving body, thereby changing lengths of an upper side and a lower side of the U letter of the cable 2 to be intended to follow the change in position of the moving body.

The cable support apparatus 3 may include two multi-articulated cables which may be curved in an approximately U-shape at any position to move along with the cable 2 while extending along the cable 2 to dynamically support the cable 2 and a plurality of bar-shaped cable holding member 35 extending to be approximately orthogonal to a length direction of the cable support members 31 to regulate the position of the cable.

Although not illustrated, the assembly 1 includes both ends providing with band type clamp fittings for fixing the plurality of cables 2 and the cable support member 31 of the cable support apparatus 3 to each other.

Figure 2:
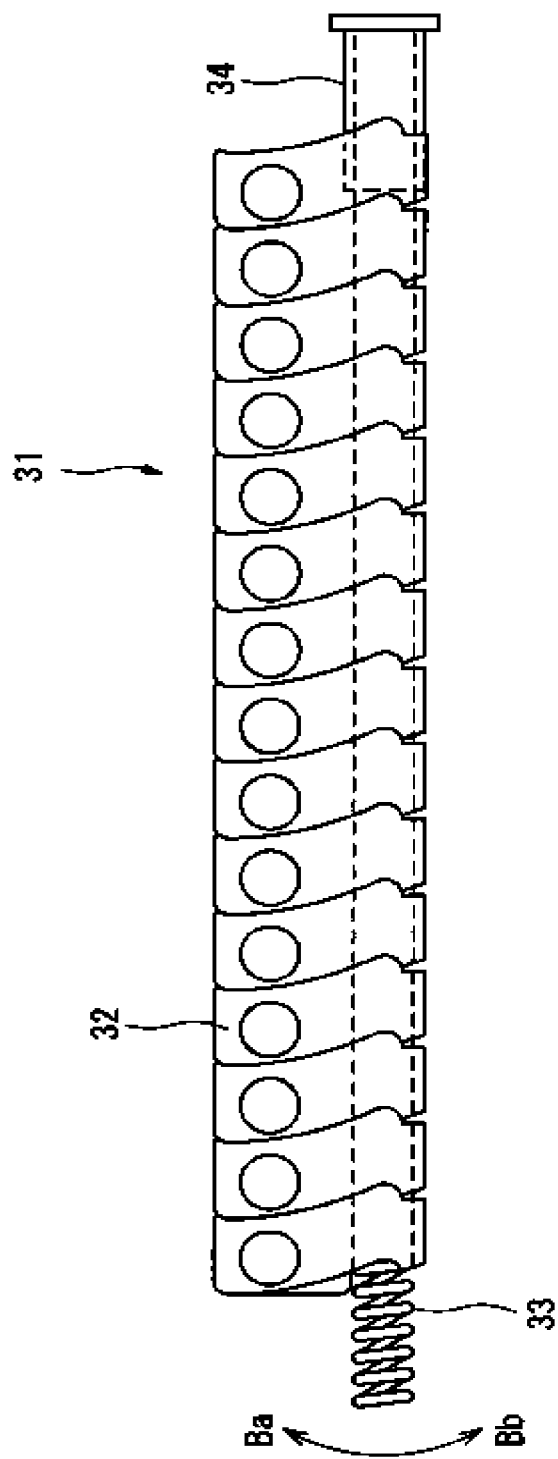
FIG. 2 is a front view illustrating one end portion of a cable support member of a cable support apparatus of the assembly.
Figure 3:
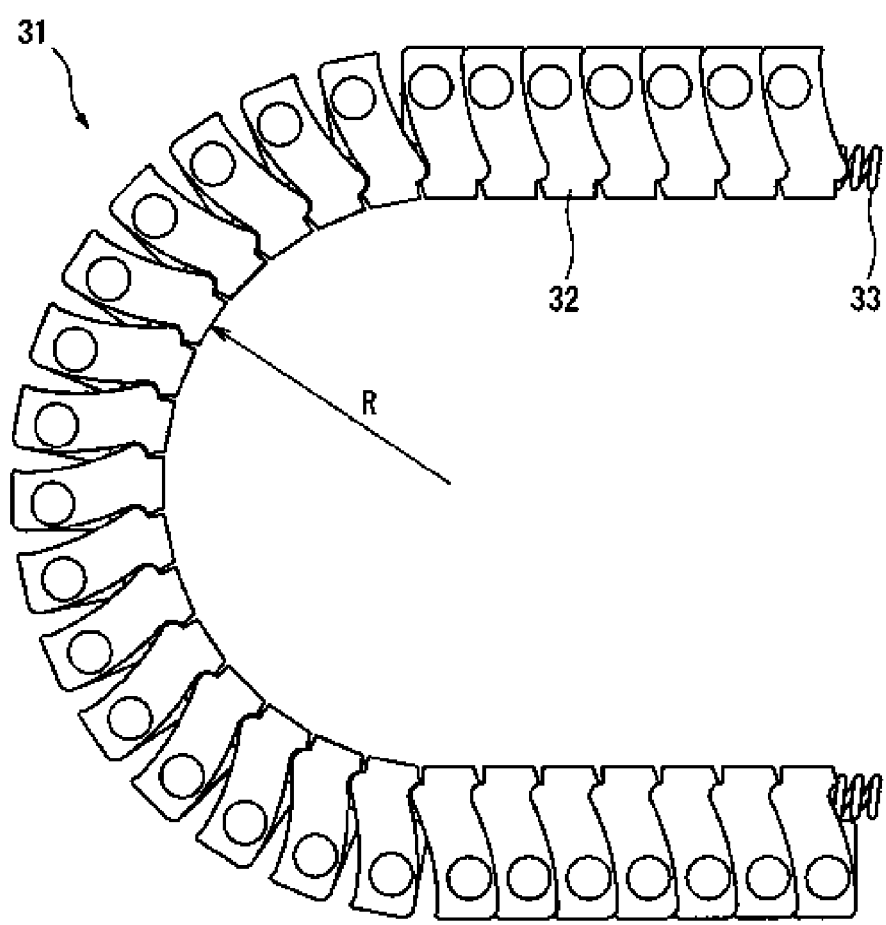
FIG. 3 is a front view illustrating the cable support member curved in a U-shape.

As can be appreciated from FIG. 2 illustrating a portion of one end of the cable support member 31 and FIG. 3 illustrating the state in which the cable support member 31 is curved in the U-shape, the cable support member 31 includes a series of piece members 32 articulated with each other and a coil spring 33 applying a compressive force to the piece members 32 to maintain the articulation of these piece members 32.

As illustrated in a front view of FIG. 4A and a side view of FIG. 4B, the piece member 32 includes a first articular surface 32a formed on a right end surface thereof by smoothly connecting between a relatively smaller or steep convex curved portion of a lower portion thereof and a relatively larger or smooth concave curved portion of an upper portion thereof, a second articular surface 32b formed on a left end surface thereof to correspond to the first articular surface 32a or have a shape supplementing it, and a longitudinal through hole 32c into which the spring 33 is inserted and a circular holding member mounting hole 32d in which the cable holding member 35 is equipped to be disposed in a direction orthogonal to the through hole 32c.

Further, when being combined with a spring 33, the piece member 32 may easily rotate in direction Bb of FIG. 2; however, it has a shape to indicate a large resistance against the rotation in direction Ba of the opposite side. The property may be obtained by appropriately setting a positional relationship between shapes of the first articular surface 32a and the second articular surface 32b and a center axis line of the first articular surface 32a and the second articular surface and the spring 33, or the like.

The spring 33 has sleeve members 34 compressively fixed to both ends thereof to apply a compressive force to the piece members 32. When the sleeve member 34 is compressively fixed to the spring 33, the spring 33 is inserted into the plurality of arranged piece members 32 and extends to apply the compressive force thereto.

Since the piece member 32 may rotate by any angle with respect to a piece member 32 adjacent thereto, the cable support member 31 may be curved in the U-shape with a radius R as illustrated in FIG. 3. Further, a position of the curved portion may move to any position by changing lengths of sides of the U letter facing each other are changed.

According to this embodiment, the cable holding member 35 is made of synthetic resin and has a cylindrical bar shape and both ends thereof are inserted into holding member mounting holes 32d installed in the piece members 32 of the two support members 31 to connect between the two support members 31. The cable holding member 35 is formed to make the outside diameters of both ends thereof larger than the inside diameter of the holding member mounting hole 32d so that the cable holding member 35 is not separated from the piece member 32 and the cable holding member 35 has both ends provided with axial slits 35a to be inserted into the mounting hole 32d. Further, to constantly maintain the interval between the two cable support members 31, the outside diameter of the more inside portion than the two left and right piece members 32 of the cable holding member 35 is set larger than the inside diameter of the mounting hole 32d.

As such, the cable holding member 35 is substantially fixed to the piece member 32 in a vertical axis line 35$_{AX}$ direction of the cable holding member 35. Further, according to this embodiment, an outside diameter of the mounting hole insertion portion is set so that the cable holding member 35 may rotate around the vertical axis line 35$_{AX}$.

Figure 5:
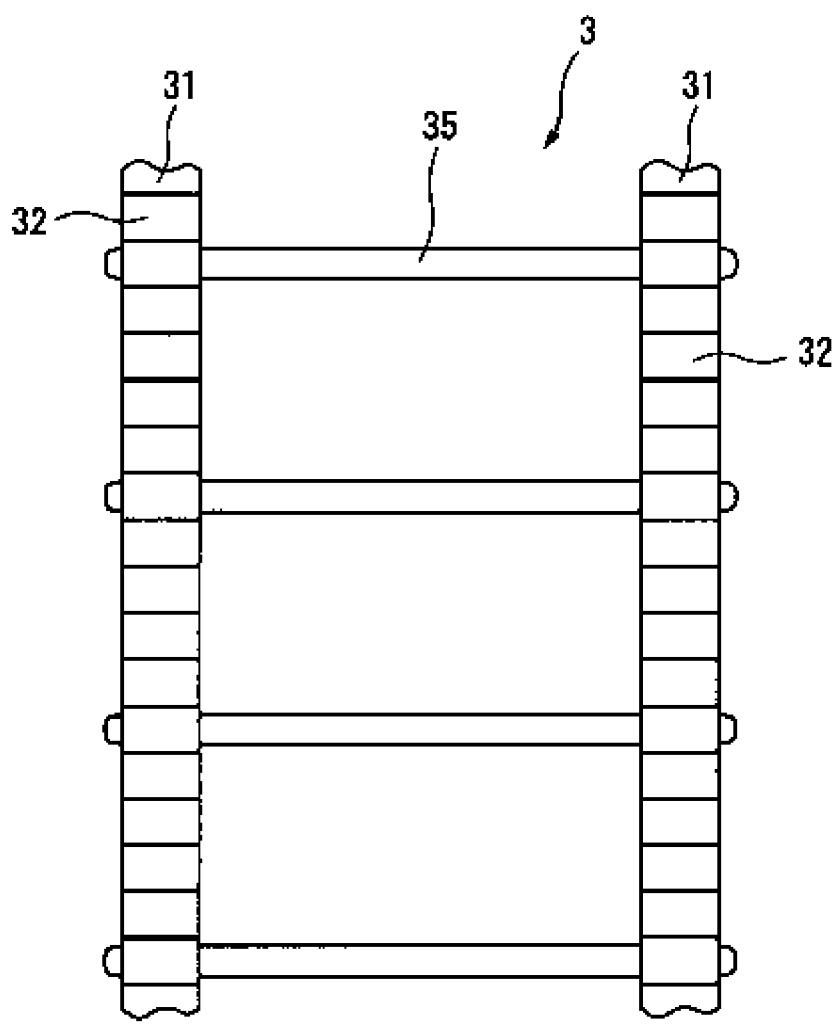
FIG. 5 is a plan view schematically illustrating the cable support apparatus of the assembly.

Further, the cable holding member mounting holes 32d are installed in all the piece members 32, but all the piece members 32 are not provided with the cable holding members 35. According to this embodiment, as illustrated in FIG. 5 which is a schematic plan view of the cable support apparatus 3, one cable holding member 35 per five piece members is installed.

As such, two cable support members 31 are connected to each other through the cable holding member 35 which is equipped in the piece member 32 of the cable support member 31. Therefore, even in the portion other than both ends fixed by the clamp fitting (not illustrated), the interval between the two cable support members 31 is constantly maintained. In particular, the twist of the cable support apparatus 3 itself which may easily occur when a moving stroke of the cable is long may be suppressed. Further, an effect of suppressing a horizontal shaking may be more improved when compared to a case in which the structure shown in FIG. 4 of Patent Document 1 is employed.

Next, a positional relationship between the cable 2 and the cable support apparatus 3 of the assembly 1 will be described. According to this embodiment, the assembly 1 is configured so that when the cable 2 is wired in the approximately U-shape, the cable 2 is disposed on an outside of the cable holding member 35, that is, the cable 2 is disposed on an outer circumferential side of the cable holding member 35, on the curved portion.

Further, as illustrated in FIG. 1, the assembly 1 is formed so that an upper end (outside end) of the cable 2 protrudes upwardly (outwardly) more than the top portion of the cable support apparatus 3. Therefore, for example, the cable 2, not the cable support apparatus 3, contacts the basic surface (not illustrated) generally installed at the lower side when the cable 2 is wired in the horizontal U-shape. Further, in this case, the cable 2 is applied with a force based on a repulsive force of the curved cable support member 31 through the cable holding member 35 to be pressed to the basic surface, thereby preventing noise and vibrations from occurring due to the contact of the cable support member and the basic member and more suppressing the heights of the curved portions of the cable and the cable support apparatus than the form of FIG. 4 disclosed in Patent Document 1.

Figure 6:
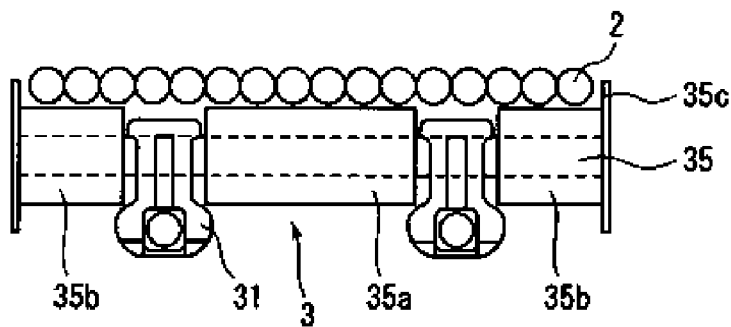
FIG. 6 is a transverse cross-sectional view of an assembly of a cable and a cable support apparatus according to a second embodiment of the present disclosure.

Next, the assembly 1 according to a second embodiment of the present disclosure will be described. As illustrated in FIG. 6 which is a transverse cross-sectional view of the assembly 1, the assembly 1 is different from that of the first embodiment in that the cable holding member 35 of the cable support apparatus 3 is not only disposed between the two cable support members 31 but also extends while protruding more outwardly in a horizontal direction of FIG. 6 than them and has a first sleeve portion 35a of a center portion coated to enlarge the outside diameter, a second sleeve portion 35b of an end side, and an end plate 35c fixed to the end.

The first sleeve portion 35a and the second sleeve portion 35b are installed so that the plurality of cables 2 may be effectively disposed horizontally without being divided by the cable support member 31 or the interval between the two cable support members 31 may be constantly maintained. Although not illustrated in FIG. 6, the end plate 35c is a circular plate and has a larger diameter than the outside diameters of the sleeve portions 35a, 35b. The position in the horizontal direction of the cable 2 is regulated by the end plate 35c.

According to the second embodiment, when the cable 2 is wired in the approximately U-shape, the cable 2 is disposed on an outside of the cable holding member 35, that is, the cable 2 is disposed on an outer circumferential side of the cable holding member 35, in the curved portion. Further, as illustrated in FIG. 6, the upper end (outside end) of the cable 2 protrudes upwardly more than the end plate 35c.

Figure 7:
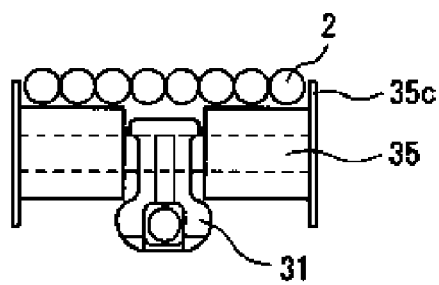
FIG. 7 is a transverse cross-sectional view of an assembly of a cable and a cable support apparatus according to a change example of the second embodiment of the present disclosure.

Next, a change example of the assembly according to the second embodiment will be described below. According to the foregoing embodiment, the cable support apparatus 3 includes the two cable support members 31 but the number of cable support members 31 is not limited to two but may be any integer of 1 or more. FIG. 7 illustrates the assembly 1 of the change example of the second embodiment. Herein, the cable support apparatus 3 includes one cable support member 31. Further, when a light and compact cable support member is required, or the like, it is preferable to make the cable support member 31 into one.

Figure 8:
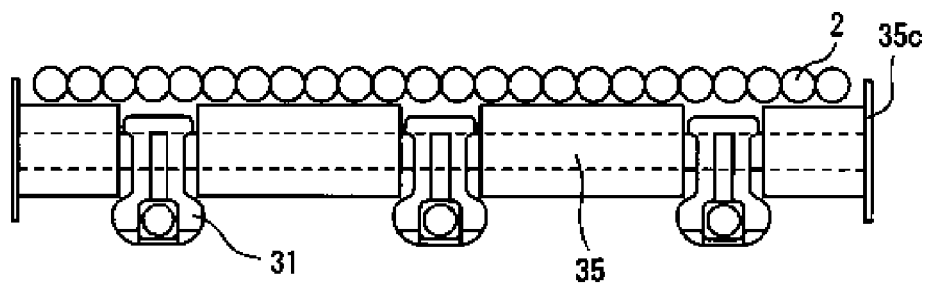
FIG. 8 is a transverse cross-sectional view of an assembly of a cable and a cable support apparatus according to another change example of the second embodiment of the present disclosure.
Figure 9:
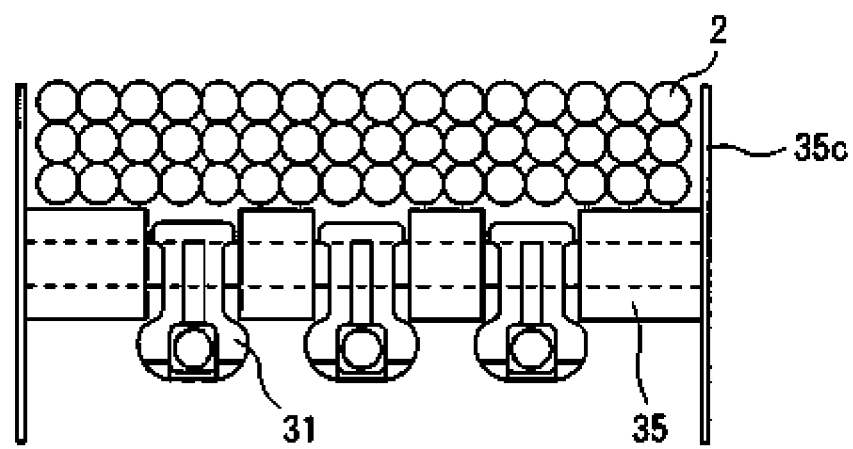
FIG. 9 is a transverse cross-sectional view of an assembly of a cable and a cable support apparatus according to still another change example of the second embodiment of the present disclosure.
Figure 10:
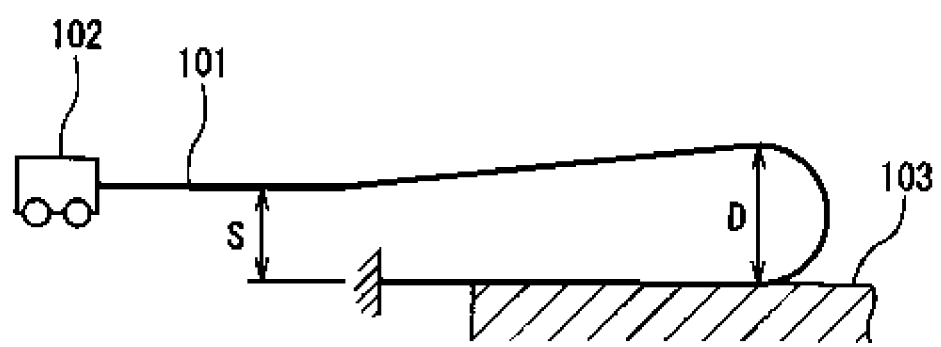
FIG. 10 is a diagram schematically illustrating a state in which an assembly of a cable and a cable support member according to the related art is horizontally wired in appropriately a U-shape.

FIGS. 8 and 9 each illustrate the assembly 1 of another change example of the second embodiment. Even in any case, the cable support apparatus 3 has three cable support members 31. However, in the assembly 1 illustrated in FIG. 9, the cable 2 is stacked in three stages.

Other embodiments

When the cable support apparatus 3 includes the plurality of cable support members 31, the embodiment in which between the two support members 31 adjacent to each other, the position of the piece member 32 is shifted by, for example, about half pitch in a length direction is possible in the present disclosure. According to the embodiment, when both ends of the two support members 31 adjacent to each other are fixed by the clamp fitting, the two support member 31 are fixed in the state in which they are shifted by, for example, about half pitch. Further, to avoid the deformation of the cable holding member 35, the holding member mounting hole 32d installed in the piece member 32 is not a circular hole, but a long round hole extending in the length direction of the cable support member 31. By this, it is possible to vertically mount the cable holding member with respect to the cable support member 31 while the pitch of the piece member 32 is mismatched at the left and right. As such, the pitch is shifted, and therefore the timings when the curved portion is changed to the straight portion or is changed in the opposite thereto mismatch each other between the two left and right support members 31, thereby reducing the vibrations and the noise occurring from the support member.

According each embodiment as described above, the cable holding member 35 may rotatably mounted around the vertical axis line $35_{AX}$ with respect to the cable support member 31; however, the present disclosure may employ an embodiment in which the cable holding member 35 is not rotatably mounted with respect to the cable support member 31. Further, the shape of the cable holding member 35 is not limited to a cylindrical shape, and therefore any shape can be adopted in the present disclosure.

The above embodiments do not describe using the cable insertion pouch which accommodates the plurality of cables 2 and the plurality of support members 31; however, an embodiment in which only the cable 2 is accommodated in the cable insertion pouch and the cable support apparatus 3 is not accommodated in the cable insertion pouch may be employed in the present disclosure.

The above embodiments describe that the cable is wired horizontally in the approximately horizontal U-shape; however, in the present disclosure, the wiring direction of the cable may be in a vertical direction or in a diagonal direction.

According to the above embodiments, the support member 31 has a coil spring 33 and is a multi-articulated shape in which the spring 33 may apply a compressive force to the articular surface of a series of piece members 32 to establish both of support property and flexibility of the cable of the support member; however, the cable support member may support the cable such that the cable may smoothly draw the U-shape and may be other multi-articulated shapes such as a chain type in which for example, link members are coupled with each other by a pin and a type in which a series of piece members are coupled with one belt-shaped thin metal spring.

Figure 4:
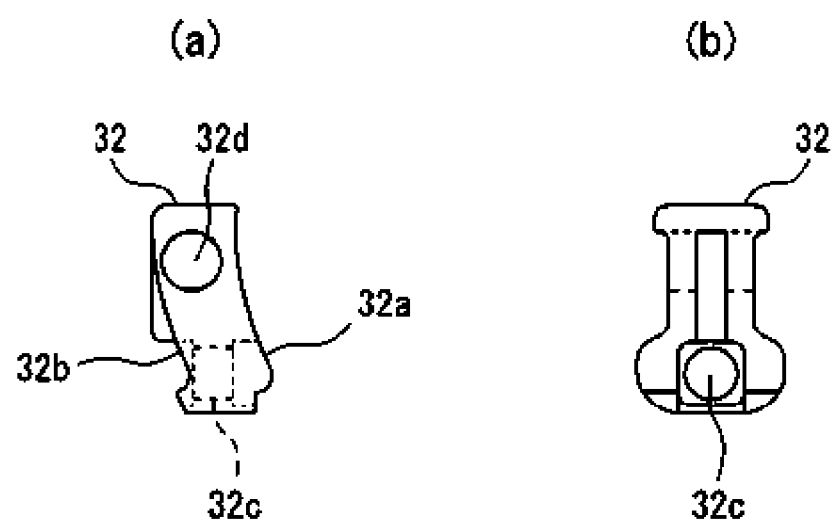
FIGS. 4A and 4B are a front view and a side view of a piece member of the cable support member.

Next, results obtained by comparing investigation results on what value the height of the curved portion of the assembly 1 according to the present disclosure actually is with the same type (hereinafter, referred to as 'existing type') as the related art illustrated in FIG. 4 of Patent Document 1 are shown in Tables 1 and 2. Table 1 shows measurement results of the change example of the second embodiment illustrated in FIG. 7 of the present disclosure and Table 2 shows measurement results of the first embodiment illustrated in FIG. 1 of the present disclosure. The experiment was performed by measuring the height D of the curved portion when the end of the upper side of the U letter moves at a predetermined stroke and speed using photographed moving pictures since the end of the lower side of the U letter is fixed and does not move. In this case, the fixed height S (vertical interval between both ends of the cable) is constant at 120 mm and the lower side of the U letter is also provided with the basic surface.

Table 1 shows the height D of the curved portion when the moving speed is changed in the state in which the stroke is constant at 1000 mm, in the change example of the second embodiment of FIG. 7 and the existing type.

TABLE 1

| Stroke: 1000 mm | | | | | |
|---|---|---|---|---|---|
| Speed (mm/s) | | 500 | 1000 | 1500 | 2000 |
| Height of curved portion (D)(mm) | Embodiment of FIG. 7 | 140 | 140 | 150 | 160 |
| | Existing type | 170 | 180 | 190 | 190 |

Table 2 shows the height D of the curved portion when the moving speed is changed in the state in which the stroke is constant at 2000 mm, in the change example of the first embodiment of FIG. 1 and the existing type.

TABLE 2

| Stroke: 2000 mm | | | | | |
|---|---|---|---|---|---|
| Speed (mm/s) | | 500 | 1000 | 1500 | 2000 |
| Height of curved portion (D)(mm) | Embodiment of FIG. 1 | 150 | 150 | 160 | 170 |
| | Existing type | 190 | 200 | 210 | 230 |

As such, according to the assembly 1 of the present disclosure, the height D of the curved portion is more increased than the fixed height S; however, the increased amount thereof, that is, (D−S) is suppressed to 33% to 57% of the increased amount of the existing type.

DESCRIPTION OF REFERENCE NUMBERS 1 assembly of cable and cable support apparatus
2 cable
3 cable support apparatus
31 cable support member
32 piece member
33 coil spring
35 cable holding member

What is claimed is:

1. An assembly of a cable and a cable support apparatus, comprising:
   at least one cable wired in an approximately U-shape and having one end repeatedly move with respect to an other end; and
   a cable support apparatus extending along the cable and curved in the approximately U-shape to support the cable,
   wherein the cable support apparatus includes a cable support member including a plurality of piece members articulated along a length direction of the cable and a plurality of bar-shaped cable holding member mounted at least some of the plurality of piece members to regulate the cable, and
   the cable is disposed on an outer circumferential side at a curved portion having the approximately U-shape with respect to the cable holding member to protrude more outwardly than the cable support apparatus.

2. The assembly of claim 1, wherein the cable support apparatus includes a plurality of cable support members disposed in parallel, and
   the plurality of cable support members are connected to each other through the plurality of cable holding members.

3. The assembly of claim 1, wherein the cable holding member is rotatably connected to the piece members.

4. The assembly of claim 2, wherein two adjacent cable support members of the plurality of cable support members are disposed so that positions in the length direction of the piece members mismatch each other between the two adjacent cable support members.

5. The assembly claim 1, wherein the cable support member includes an elastic member inserted into the plurality of piece members to apply a compressive force to the plurality of piece member in the length direction.

6. The assembly of claim 2, wherein the cable holding member is rotatably connected to the piece members.

7. The assembly claim 2, wherein the cable support member includes an elastic member inserted into the plurality of piece members to apply a compressive force to the plurality of piece member in the length direction.

8. The assembly claim 4, wherein the cable support member includes an elastic member inserted into the plurality of piece members to apply a compressive force to the plurality of piece member in the length direction.

\* \* \* \* \*